United States Patent
Yu et al.

(10) Patent No.: US 8,902,572 B2
(45) Date of Patent: Dec. 2, 2014

(54) ELECTRONIC DEVICE

(75) Inventors: Wei-Wei Yu, Shenzhen (CN); Che-Yu Chou, New Taipei (TW); Qun Huang, Shenzhen (CN); Tai-Shan Zhu, Shenzhen (CN); Tao Jiang, Shenzhen (CN); Wen-Chih Lan, New Taipei (TW); Hai-Qian Ge, Shenzhen (CN); Jun-Liang Zhang, Shenzhen (CN); Zhi-Jun Shi, Shenzhen (CN); Ji-Bing Guo, Shenzhen (CN); Hua-Yong Wang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 302 days.

(21) Appl. No.: 13/485,978

(22) Filed: Jun. 1, 2012

(65) Prior Publication Data

US 2013/0083460 A1    Apr. 4, 2013

(30) Foreign Application Priority Data

Sep. 30, 2011   (CN) .......................... 2011 1 0296704

(51) Int. Cl.
*G06F 1/16* (2006.01)
*H04M 1/02* (2006.01)

(52) U.S. Cl.
CPC ........... *H04M 1/0235* (2013.01); *G06F 1/1624* (2013.01)
USPC ............ 361/679.06; 361/679.07; 361/679.08; 379/433.12; 379/433.13

(58) Field of Classification Search
CPC ...... G06F 1/162; G06F 1/1622; G06F 1/1624
USPC ...................................... 361/679.06
See application file for complete search history.

(56) References Cited

U.S. PATENT DOCUMENTS

| | | | | |
|---|---|---|---|---|
| 5,103,376 | A * | 4/1992 | Blonder | 361/679.09 |
| 5,255,214 | A * | 10/1993 | Ma | 361/679.06 |
| 5,494,447 | A * | 2/1996 | Zaidan | 439/31 |
| 5,900,848 | A * | 5/1999 | Haneda et al. | 345/1.1 |
| 6,483,445 | B1 * | 11/2002 | England | 341/22 |
| 6,532,147 | B1 * | 3/2003 | Christ, Jr. | 361/679.27 |
| 6,836,404 | B2 * | 12/2004 | Duarte | 361/679.09 |
| 7,158,634 | B2 * | 1/2007 | Eromaki | 379/433.13 |
| 7,277,275 | B2 * | 10/2007 | Won et al. | 361/679.27 |
| 7,599,181 | B2 * | 10/2009 | Chuang et al. | 361/679.55 |
| 7,787,242 | B2 * | 8/2010 | Schwager et al. | 361/679.28 |
| 7,986,517 | B2 * | 7/2011 | Jiang et al. | 361/679.27 |
| 8,290,549 | B2 * | 10/2012 | Reeves et al. | 455/575.3 |
| 8,412,279 | B2 * | 4/2013 | Griffin et al. | 455/566 |

(Continued)

*Primary Examiner* — Anthony Q Edwards
(74) *Attorney, Agent, or Firm* — Novak Druce Connolly Bove + Quigg LLP

(57) ABSTRACT

An electronic device includes a first body having a top surface, a second body slidably covering on the first body, and at least one connecting member for connecting the first body with the second body. The second body is capable of sliding from a first position covering the top surface to a second position uncovering the top surface. When the second body is in the first position, the first body hides the top surface to allow the electronic device being used in a first state, and when the second body is in the second position, the second body is operable to be coplanar with the first body to allow the electronic device being used in a second state.

14 Claims, 6 Drawing Sheets

(56) References Cited

U.S. PATENT DOCUMENTS

| | | | |
|---|---|---|---|
| 2004/0165342 A1* | 8/2004 | Chang | 361/681 |
| 2006/0256512 A1* | 11/2006 | Esther Kang | 361/681 |
| 2010/0188350 A1* | 7/2010 | Sawada | 345/173 |
| 2011/0012858 A1* | 1/2011 | Brookes et al. | 345/173 |

\* cited by examiner

ELECTRONIC DEVICE

BACKGROUND

1. Technical Field

The present disclosure relates to electronic devices, and particularly to an electronic device having a first body and a second body being operated to be coplanar with the first body.

2. Description of Related Art

Foldable electronic devices, such as mobile phones, include a main body and a cover coverable on the main body. When the electronic device is to be used, the cover is operable to be unfolded. However, for many foldable electronic devices the cover cannot be operated to be coplanar with the main body when is unfolded, and the electronic device cannot be used in a panel fashion.

Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the six views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
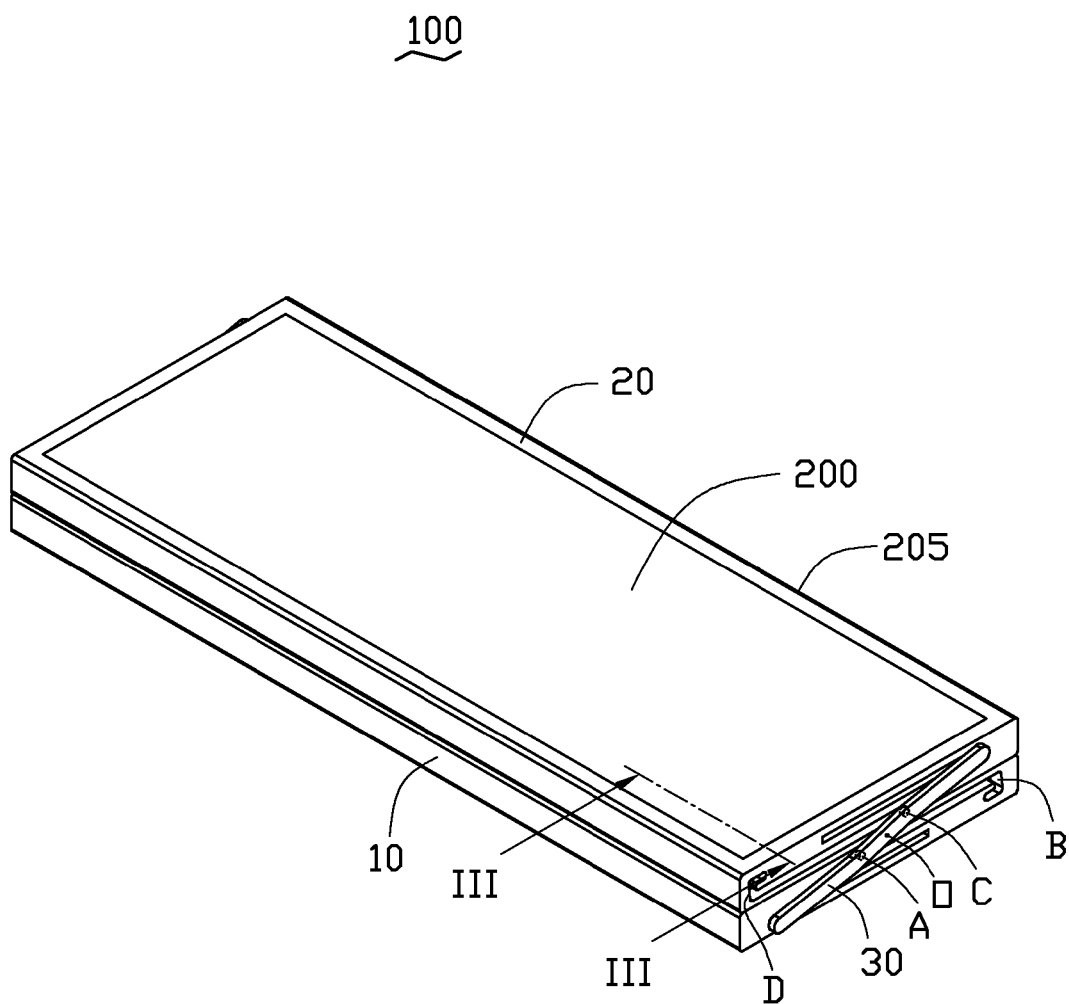
FIG. 1 is a perspective view of an electronic device including a first body and a second body covering on the first body in accordance with an embodiment.

Referring to FIG. 1, a perspective view of an electronic device 100 in accordance with an embodiment is shown. The electronic device 100 includes a first body 10, a second body 20 slidably covering on the first body 10, and two connecting members 30 connecting the first body 10 with the second body 20. The electronic device 100 is capable being used in a first panel state with the second body 20 covering on the first body 10 and in a second panel state with the second body 20 being unfolded to be coplanar with the first body 10. In the embodiment, the electronic device 100 is a foldable mobile phone. The first body 10 is a main body of the electronic device 100 for housing a battery, a processor, and other electronic components (not shown). The second body 20 is a cover of the electronic device for mounting a display 200 in a surface opposite to the first body 10.

Figure 2:
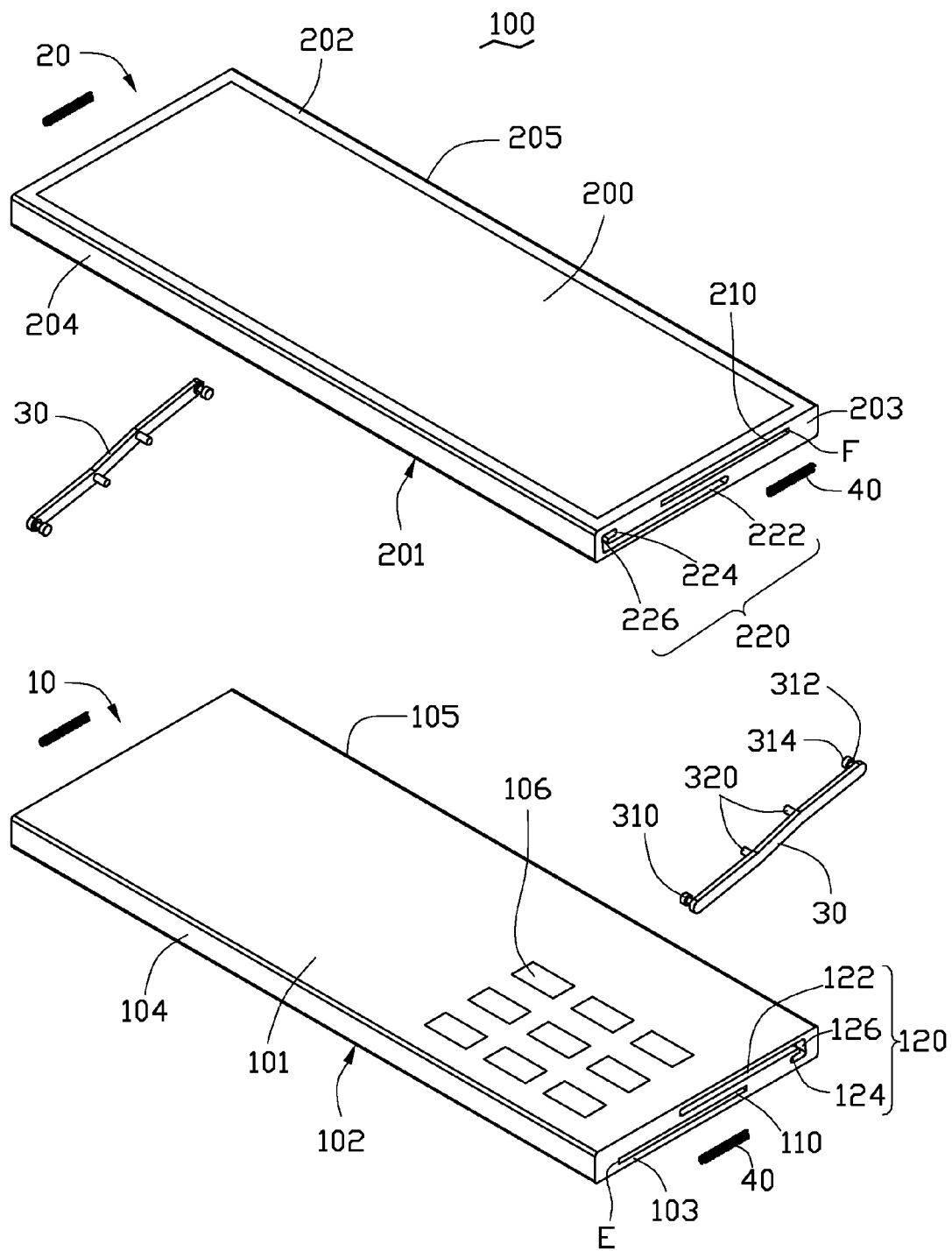
FIG. 2 is a partially disassembled perspective view of the electronic device of FIG. 1.
Figure 3:
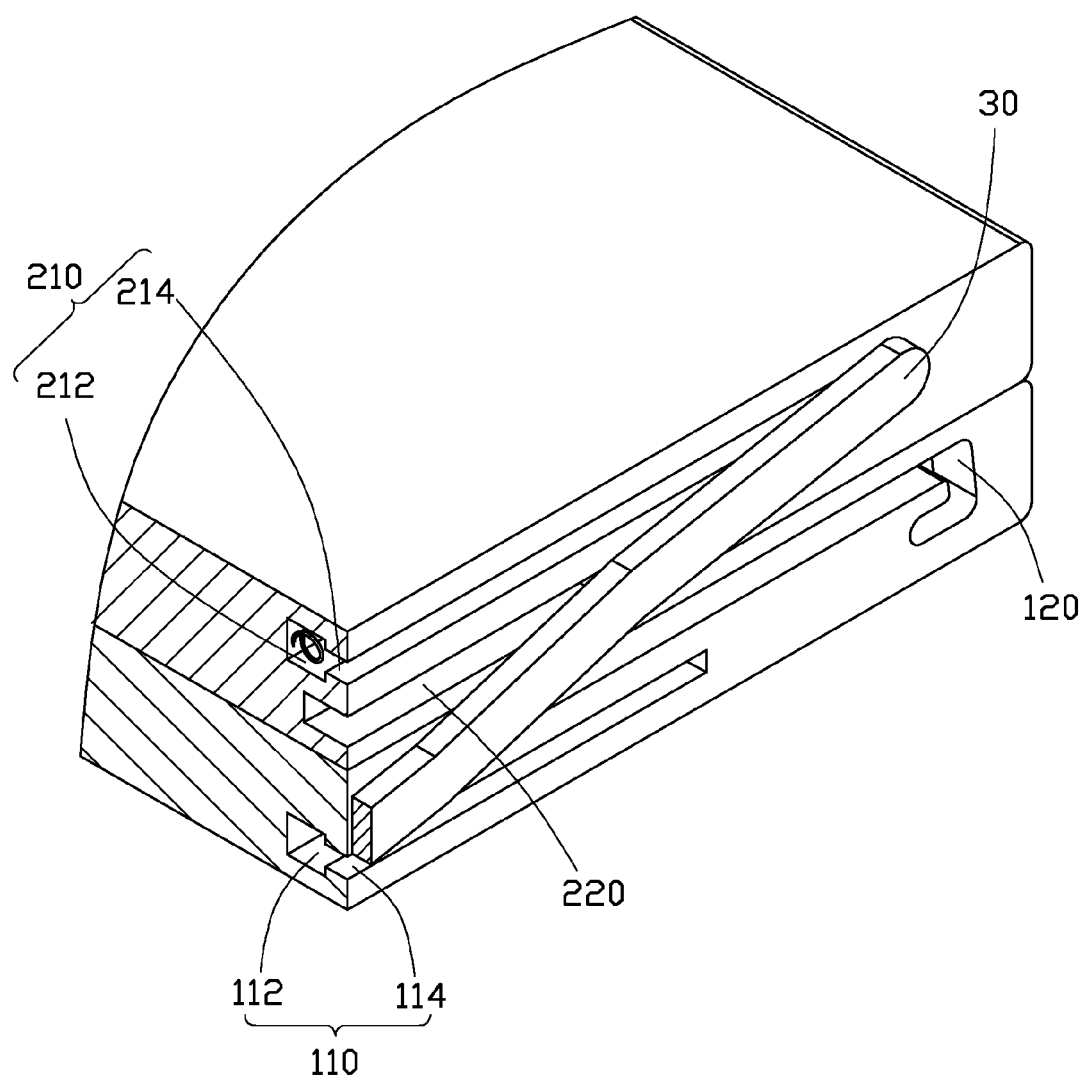
FIG. 3 is a cross-sectional view of the electronic device taken along line III-III in FIG. 1.

Referring also to FIGS. 2-3, the first body 10 is substantially rectangular, and includes a top surface 101 facing the second body 20, a bottom surface 102 opposite to the top surface 101, two first sidewalls 103, a second sidewall 104, and a third sidewall 105 opposite to and parallel to the second sidewall 104. The second and third sidewall 104, 105 are perpendicular to the first sidewalls 103. An input device 106 is mounted on the top surface 101. The input device 106 is a keyboard in the embodiment.

Each first sidewall 103 defines a first guiding slot 110 and a first sliding slot 120. The vertical cross-section of the first guiding slot 110 is substantially T-shaped. The first guiding slot 110 is arranged adjacent to the bottom surface 102 and the second sidewall 104, and extends in a direction parallel to the top surface 101. The first guiding slot 110 is defined in the first sidewall 103, and includes a first portion 112 and a first opening 114 communicating with the first portion 112. The vertical width of the first portion 112 is greater than the vertical width of the first opening 114.

Each first sliding slot 120 is substantially L-shaped, and is arranged adjacent to the top surface 101 and the third sidewall 105. The first sliding slot 120 includes a first sliding portion 122, a first latching portion 124, and a first connecting portion 126 communicating the first sliding portion 122 with the first latching portion 124. The first sliding portion 122 extends in a direction parallel to the top surface 101, and is arranged between the top surface 101 and the first guiding slot 110. The horizontal length of the first sliding portion 122 is less than the horizontal length of the first guiding slot 110. An end of the first sliding portion 122 (hereinafter, the end A, see FIG. 4) is adjacent to the second sidewall 104, the other end of the first sliding portion 122 opposite to the end A (hereinafter, the end B, see FIG. 4) is adjacent to the third sidewall 105. The first connecting portion 126 extends from the end B of the first sliding portion 122 in a direction away from the top surface 101. The first latching portion 124 extends from an end of the first connecting portion 126 away from the top surface 101 in a direction parallel to the top surface 101 and adjacent to the second sidewall 104. The first latching portion 124 is substantially aligned with the first guiding slot 110.

The second body 20 is substantially rectangular, and includes a first surface 201 corresponding to the top surface 101, a second surface 202 opposite to the first surface 201, two first end portions 203, a second end portion 204, and a third end potion 205 opposite to and parallel to the second end portion 204. The second and third end portions 204, 205 are perpendicular to the first end portions 203. When the second body 20 rests on the first body 10, the first end portions 203 corresponds to the first sidewalls 103 respectively. The second end portion 204 corresponds to the second sidewall 104, and the third end portion 205 corresponds to the third sidewall 105 respectively. Each first end portion 203 defines a second guiding slot 210 and a second sliding slot 220. The display 200 is fixed to the second surface 201. In the embodiment, the display 200 is a touch-sensitive display.

Each second guiding slot 210 is arranged adjacent to the second surface 202 and the third end portion 205. The structure of the second guiding slot 210 is substantially similar to the structure of the first guiding slot 110. The second guiding slot 210 is defined at the first end portion 203, and includes a second portion 212 and a second opening 214 communicating with the second portion 212. The vertical width of the second portion 212 is greater than that of the second opening 214.

Each second sliding slot 220 is arranged adjacent to the first surface 201 and the second end portion 204. The structure of each second sliding slot 220 is substantially similar to the structure of each first sliding slot 120. The second sliding slot 220 includes a second sliding portion 222, a second latching portion 224, and a second connecting portion 226 communicating the second sliding portion 222 with the second latching portion 224. The second sliding portion 222 extends in a direction parallel to the first surface 201, and is arranged between the first surface 201 and the second guiding slot 210.

The horizontal length of the second sliding portion 222 is less than the horizontal length of the second guiding slot 210. An end of the second sliding portion 222 (hereinafter, the end C, see FIG. 4) is adjacent to the third end portion 205, the other end of the second sliding portion 222 opposite to the end C (hereinafter, the end D, see FIG. 4) is adjacent to the second end portion 204. The second connecting portion 226 extends from the end D of the second sliding portion 222 in a direction away from the first surface 201. The second latching portion 224 extends from an end of the second connecting portion 226 away from the first surface 201 in a direction parallel to the first surface 201 and adjacent to the third end portion 205. The second latching portion 224 is substantially aligned with the second guiding slot 210.

In the embodiment, when the second body 20 rests on the first body 10, a line connecting the ends B and D defines a center O (see FIG. 1). The first guiding slot 110 is symmetrical to the second guiding slot 210 relative to the center O, and the first sliding slot 120 is also symmetrical to the second sliding slot 220 relative to the center O.

Each connecting member 30 includes two sliding posts 310 and two guiding posts 320. The two sliding posts 310 are arranged at opposite ends of the connecting member 30. The two guiding posts 320 are arranged between the two sliding posts 310 and are spaced from each other. Each sliding post 310 includes a connecting rod 312 perpendicularly extending from the connecting member 30, and a cylindrical limiting portion 314 fixed to an end of the connecting rod 312 away from the connecting member 30. The two connecting rods 312 are slidably received in the first opening 114 and the second opening 214, respectively. The two limiting portions 314 are slidably received in the first portion 112 and the second portion 212, respectively. The diameter of the limiting portion 314 is greater than the diameter of the connecting rod 312 and is slightly greater than the width of the first and second openings 114, 214 in vertical direction. In the embodiment, referring to FIG. 1, when the second body 20 rests on the first body 10, the two sliding posts 310 are respectively positioned at an end E (see FIG. 2) of the first guiding slot 110 adjacent to the second sidewall 104, and an end F (see FIG. 2) of the second guiding slot 210 adjacent to the third end portion 205. The two guiding posts 320 are respectively positioned at the ends A and C. A shape of a line (not shown) connecting the two sliding posts 310 and the two guiding posts 320 is substantially similar to a line (not shown) orderly connecting the end E, the end A, the end C and the end F.

The electronic device 100 further includes four elastic elements 40. The elastic elements 40 are respectively received in the two first sliding slots 110 and the two second sliding slots 210. In the embodiment, the elastic elements 40 are spiral springs.

Figure 4:
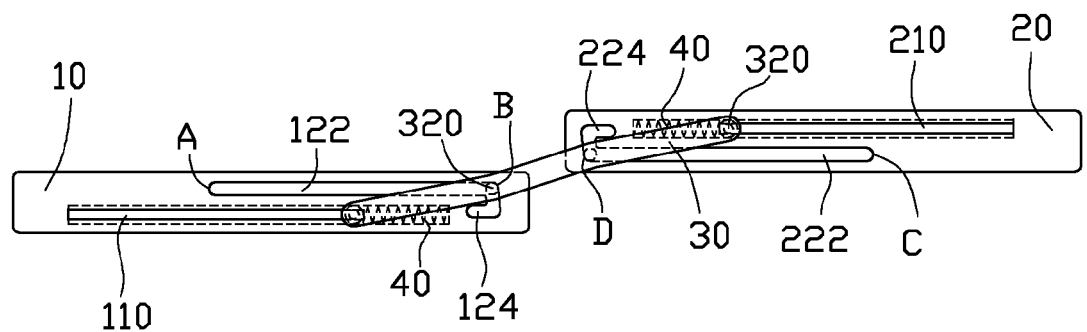
FIGS. 4-6 are a perspective view showing the electronic device of FIG. 1 being operated to be used in a panel state.

Referring to FIG. 4, in assembly, two of the elastic elements 40 are received in the first portions 112 of the first sliding slots 110, and two of the limiting portions 314 are received in the first portions 112 and are arranged between the end E and the elastic elements 40. The two guiding posts 320 are receiving in the first and second guiding slots 120, 220, respectively. The other two of the elastic elements 40 are received in the second portions 212 of the second sliding slots 210, and the other two of limiting portions 314 are received in the second portions 212 and are arranged between the end F and the elastic elements 40.

After assembly, as the first and second sliding slots 110, 210, and the first and second sliding portions 122 and 222 extends in a direction parallel to the top surface 101 and the first surface 201. The second body 20 is limited to slide along the extending direction of the first and second sliding slots 110, 210 relative to the first body 10 by the sliding posts 310, and the guiding posts 320 being received in the second sliding slots 210 and the second guiding slots 220 respectively.

Referring to FIG. 1, when the second body 20 rests on the first body 10, the first surface 201 covers on the top surface 101 to hide the input device 106. The electronic device 100 can be used in the first panel state, and the display 200 is operated as an input device to receive touch inputs and also as an output device to display information.

Figure 5:
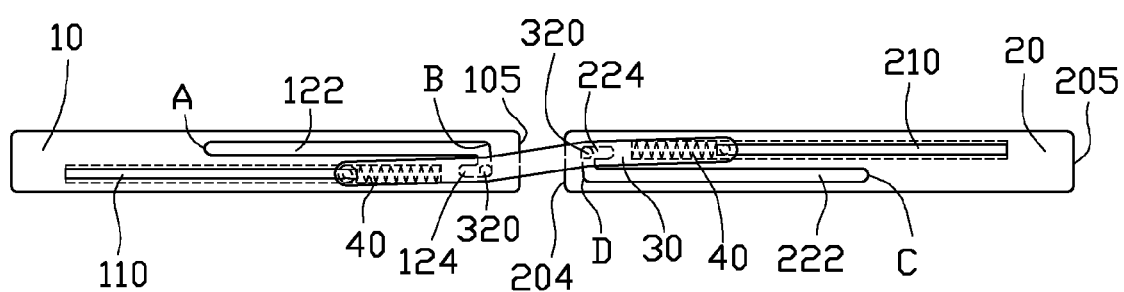
Figure 6:
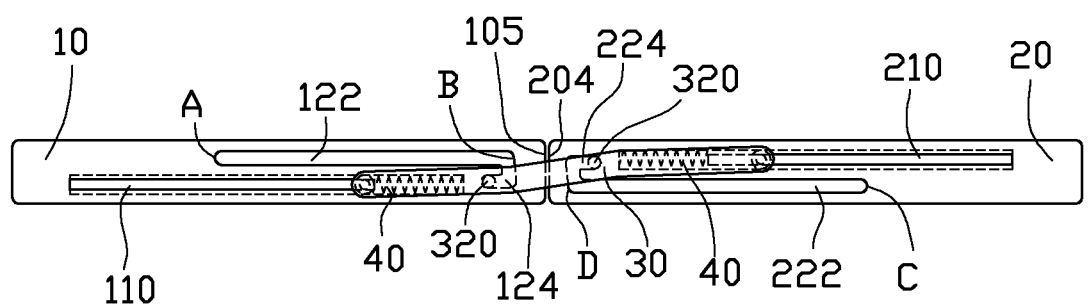

To use the electronic device 100 in the second panel state: firstly, referring to FIG. 4, the second body 20 is operated to slide in a direction parallel to the extending direction of the sliding slots 110, 210, such that the top surface 101 of the first body 10 is exposed without the first surface 201 of the second body 20 covering thereon. At this time, the sliding posts 310 slide along the first and second sliding slots 110, 210 to deform the elastic elements 40, the guiding posts 320 move to the ends B and D respectively. Secondly, referring to FIGS. 5-6, the second body 20 is pressed to move downward in a direction perpendicular to the top surface 101, the guiding posts 320 slide along the first connecting portion 126, and the second body 20 is coplanar with the first body 10. Finally, the second body 20 is released, and the deformed elastic elements 40 drives the second body 20 moving to abut the first body 10 with the second end portion 204 resisting against the third sidewall 105, and the guiding posts 320 are limited to be positioned at the latching portion 124. As a result, the electronic device 100 can be used in the second panel state, the display 200 is used as a display device, and the input device 106 is used to receive user input operation.

It is to be understood, even though information as to, and advantages of, the present embodiments have been set forth in the foregoing description, together with details of the structures and functions of the present embodiments, the disclosure is illustrative only; and that changes may be made in detail, especially in the matters of shape, size, and arrangement of parts within the principles of the present embodiments to the full extent indicated by the broad general meaning of the terms in which the appended claims are expressed.

What is claimed is:

1. An electronic device, comprising:
a first body comprising a top surface;
a second body slidably covering on the first body and capable of sliding from a first position covering the top surface to a second position uncovering the top surface; and
at least one connecting member for connecting the first body with the second body;
wherein when the second body is in the first position, the second body rests on the first body to cover the top surface and allow the electronic device being used in a first state, and when the second body is in the second position, the second body is operable to be coplanar with the first body to allow the electronic device being used in a second state, the first body comprises two first sidewalls perpendicular to the top surface, a second sidewall, and a third sidewall opposite to and parallel to the second sidewall, the second and third sidewalls are perpendicular to the first sidewalls, each first sidewall defines a first sliding slot and a first guiding slot, the first sliding slot extends in a direction parallel to the top surface and is adjacent to the second sidewall, and the first guiding slot is arranged between the first sliding slot and the top surface and is adjacent to the third sidewall.

2. The electronic device of claim 1, wherein the first sliding slot comprises a first portion and a first opening, the first opening communicates with the first portion and is defined at the first sidewall, and the vertical width of the first portion is greater than the vertical width of the first opening.

3. The electronic device of claim 1, wherein the first guiding slot comprises a first sliding portion, a first latching portion, and a first connecting portion communicating the first sliding portion with the first latching portion, the first sliding portion extends in a direction parallel to the top surface, and is arranged between the top surface and the first guiding slot.

4. The electronic device of claim 3, wherein the first connecting portion extends from an end of the first sliding portion in a direction away from the top surface, and the first latching portion extends from an end of the first connecting portion away from the first sliding portion in a direction adjacent to the second sidewall.

5. The electronic device of claim 1, wherein the second body comprises a first surface corresponding to the top surface, two first end portions corresponding to the first sidewalls respectively, a second end portion corresponding to the second sidewall, and a third end portion corresponding to the third sidewall.

6. The electronic device of claim 5, further comprising a display, wherein the display is mounted on a second surface of the second body opposite to the first surface.

7. The electronic device of claim 6, wherein the display is a touch sensitive display.

8. The electronic device of claim 5, wherein each first end portion defines a second sliding slot and a second guiding slot, the second sliding slot extends in a direction parallel to the first surface and is adjacent to the third end portion, and the second guiding slot is arranged between the second sliding slot and the first surface and is adjacent to the second end portion.

9. The electronic device of claim 8, wherein the second sliding slot comprises a second portion and a second opening, the second opening communicates with the second portion and is defined at the first end portion, and the vertical width of the second portion is greater than the vertical width of the second opening.

10. The electronic device of claim 8, wherein the second guiding slot comprises a second sliding portion, a second latching portion, and a second connecting portion communicating the second sliding portion with the second latching portion, the second sliding portion extends in a direction parallel to the first surface, and is arranged between the first surface and the second guiding slot.

11. The electronic device of claim 10, wherein the second connecting portion extends from an end of the second sliding portion in a direction away from the first surface, and the second latching portion extends from an end of the second connecting portion away from the second sliding portion in a direction adjacent to the third end portion.

12. The electronic device of claim 8, wherein each connecting member comprises two sliding posts and two guiding posts, the two sliding posts are arranged at opposite ends of each connecting member, the two guiding posts are arranged between the two sliding posts and spaced from each other.

13. The electronic device of claim 12, wherein the two sliding posts are slidably received in the first and second sliding slots, and the two guiding slots are slidably received in the first and second guiding slots.

14. The electronic device of claim 13, further comprising at least two elastic elements respectively received in the first and second sliding slots, wherein opposite ends of one elastic element abut one of the sliding posts and an end of the first sliding slots away from the second sidewall, and opposite ends of the other one elastic element abut the other one of the sliding posts and an end of the second sliding slots adjacent to the second end portion.

* * * * *